US012628124B2

(12) United States Patent　　(10) Patent No.:　US 12,628,124 B2
　Zhang　　　　　　　　　　　　　(45) Date of Patent:　　May 12, 2026

(54) PAGING METHOD AND APPARATUS, AND STORAGE MEDIUM

(71) Applicant: DATANG MOBILE COMMUNICATIONS EQUIPMENT CO., LTD., Beijing (CN)

(72) Inventor: Huiying Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 334 days.

(21) Appl. No.: 18/551,593

(22) PCT Filed: Jan. 17, 2022

(86) PCT No.: PCT/CN2022/072410
　§ 371 (c)(1),
　(2) Date: Sep. 20, 2023

(87) PCT Pub. No.: WO2022/199233
　PCT Pub. Date: Sep. 29, 2022

(65) Prior Publication Data
　US 2024/0179679 A1　May 30, 2024

(30) Foreign Application Priority Data

Mar. 25, 2021　(CN) .......................... 202110330530.2

(51) Int. Cl.
　*H04W 68/02*　　(2009.01)
　*H04W 76/28*　　(2018.01)
　*H04W 92/18*　　(2009.01)
(52) U.S. Cl.
　CPC ......... *H04W 68/025* (2013.01); *H04W 76/28* (2018.02); *H04W 92/18* (2013.01)
(58) Field of Classification Search
　None
　See application file for complete search history.

(56) References Cited

U.S. PATENT DOCUMENTS

| 11,997,644 | B2 * | 5/2024 | Ji | .......................... H04W 68/02 |
| 2019/0289561 | A1 | 9/2019 | Corley et al. | |

(Continued)

FOREIGN PATENT DOCUMENTS

| CN | 108207017 A | 6/2018 |
| CN | 108307489 A | 7/2018 |

(Continued)

OTHER PUBLICATIONS

ISA State Intellectual Property Office of the People's Republic of China, International Search Report and Written Opinion issued in Application No. PCT/CN2022/072410, Apr. 11, 2022, WIPO, 13 pages.

(Continued)

*Primary Examiner* — Eunsook Choi
(74) *Attorney, Agent, or Firm* — KILPATRICK TOWNSEND & STOCKTON LLP

(57) ABSTRACT

The present application provides a paging method and apparatus, and a storage medium. The method includes: the first terminal determining a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal; monitoring the paging message on the direct communication interface according to the sidelink paging occasion. Therefore, the monitoring of the paging message from the network device by the relayed terminal (i.e., the first terminal) in the relay scenario is realized.

19 Claims, 6 Drawing Sheets

(56) References Cited

U.S. PATENT DOCUMENTS

| | | | |
|---|---|---|---|
| 2019/0373578 A1 | 12/2019 | Hong et al. | |
| 2023/0224859 A1* | 7/2023 | Cheng | H04W 68/02 |
| | | | 455/458 |
| 2023/0239837 A1* | 7/2023 | Ye | H04W 72/02 |
| | | | 370/329 |
| 2023/0319715 A1* | 10/2023 | Zhang | H04W 68/02 |
| | | | 455/574 |
| 2023/0337259 A1* | 10/2023 | Son | H04W 76/28 |
| 2024/0098815 A1* | 3/2024 | Freda | H04W 76/14 |
| 2024/0292485 A1* | 8/2024 | Yang | H04W 72/25 |
| 2024/0381309 A1* | 11/2024 | Xu | H04W 68/02 |

FOREIGN PATENT DOCUMENTS

| | | |
|---|---|---|
| CN | 109891947 A | 6/2019 |
| EP | 4152842 A1 | 3/2023 |
| WO | 2018064477 A1 | 4/2018 |
| WO | 2018137284 A1 | 8/2018 |
| WO | 20180195917 A1 | 11/2018 |
| WO | 2018233809 A1 | 12/2018 |
| WO | 2020150871 A1 | 7/2020 |

OTHER PUBLICATIONS

Vivo, "Remaining issues on L2 U2N Relay", 3GPP TSG-RAN WG2 Meeting #113-e, E-Meeting, Jan. 25-Feb. 5, 2021, total 8 pages, R2-2101179.
Zte, "Further consideration on the paging of remote Ue", 3GPP TSG RAN WG2 #98, Hangzhou, China, May 15-19, 2017, total 4 pages, R2-1704638.
Sierra Wireless S.A., "Methods for configuring SL DRX and Paging", 3GPP TSG-RAN WG2 Meeting #112 electronic, Online, Nov. 2-13, 2020, total 3 pages, R2-2008971.
European Patent Office, Extended European Search Report Issued in Application No. 22773895.2, Sep. 3, 2024, Germany, 11 pages.
State Intellectual Property Office of the People's Republic of China, Office Action Issued in Application No. 202110330530.2, Aug. 30, 2024, 10 pages.

* cited by examiner

PAGING METHOD AND APPARATUS, AND STORAGE MEDIUM

CROSS-REFERENCES TO RELATED APPLICATIONS

The present application is a National Stage of International Application No. PCT/CN2022/072410, filed on Jan. 17, 2022, which claims the priority of a Chinese patent application No. 202110330530.2 and titled "PAGING METHOD AND APPARATUS, AND STORAGE MEDIUM", which was filed with the China National Intellectual Property Administration on Mar. 25, 2021. The content of the above applications are incorporated into the present application by reference in their entireties.

FIELD

The present application relates to the field of communication, in particular, to a paging method and apparatus, and a storage medium.

BACKGROUND

In order to expand the coverage of a network, a terminal to a network device relay (UE-to-Network relay, hereinafter referred to as a relay) is introduced. The terminal and the network can establish a connection and exchange information with the network device through the relay.

In a communication scenario without the relay, the network device can page the terminal that is in an idle state or a non-active state: correspondingly, the terminal monitors a paging message according to a discontinuous reception (DRX) mechanism, and restores the communication connection with the network device after receiving the paging message. However, there is a lack of relevant solution for how a relayed terminal monitors the paging message in the relay scenario.

SUMMARY

The present application provides a paging method and apparatus, and a storage medium, which are used for monitoring a paging message of a network device by a relayed terminal in a relay scenario.

According to embodiments of the present application, there is provided a paging method, which is applied to a first terminal and includes:

determining a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal;

monitoring the paging message on the direct communication interface according to the sidelink paging occasion.

According to embodiments of the present application, there is provided a paging method, which is applied to a second terminal and includes:

receiving a paging message from a network device for paging a first terminal, the second terminal acting as a terminal for providing relay service to the first terminal;

determining a sidelink paging occasion for the first terminal according to a discontinuous transmission (DTX) mechanism, the sidelink paging occasion being an occasion for the first terminal to monitor the paging message on a direct communication interface through which communication with the second terminal is performed;

transmitting the paging message to the first terminal through the direct communication interface according to the sidelink paging occasion.

According to embodiments of the present application, there is provided a paging apparatus, which is applied to an access network device and includes a memory, a transceiver, and a processor:

the memory is configured to store a computer program;

the transceiver is configured to transmit and receive data under control of the processor;

the processor is configured to read the computer program from the memory and perform the following operations:

determining a sidelink paging occasion according to a DRX mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message is a paging message from a network device for paging the first terminal;

monitoring the paging message on the direct communication interface according to the sidelink paging occasion.

According to embodiments of the present application, there is provided a paging apparatus, which is applied to the second terminal and a memory, a transceiver, and a processor:

the memory is configured to store a computer program;

the transceiver is configured to transmit and receive data under control of the processor;

the processor is configured to read the computer program from the memory and perform the following operations:

receiving a paging message from a network device for paging a first terminal, the second terminal acting as a terminal for providing relay service to the first terminal;

determining a sidelink paging occasion for the first terminal according to a DTX mechanism, the sidelink paging occasion being an occasion for the first terminal to monitor the paging message on a direct communication interface through which communication with the second terminal is performed;

transmitting the paging message to the first terminal through the direct communication interface according to the sidelink paging occasion.

According to embodiments of the present application, there is provided a paging apparatus, which is applied to the first terminal and includes:

a determining device, configured to determine a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message is a paging message from a network device for paging the first terminal;

a monitoring device, configured to monitor the paging message on the direct communication interface according to the sidelink paging occasion.

According to embodiments of the present application, there is provided a paging apparatus, which is applied to the second terminal and includes:

a receiving device, configured to receive a paging message from a network device for paging a first terminal, the second terminal acting as a terminal for providing relay service to the first terminal;

a determining device, configured to determine a sidelink paging occasion for the first terminal according to a discontinuous transmission (DTX) mechanism, the sidelink paging occasion being an occasion for the first terminal to monitor the paging message on a direct communication interface through which communication with the second terminal is performed;

a transmitting device, configured to transmit the paging message to the first terminal through the direct communication interface according to the sidelink paging occasion.

According to embodiments of the present application, there is provided a processor-readable storage medium, which stores a computer program, the computer program is used for enabling a processor to execute the paging method described in the aforementioned embodiments.

According to embodiments of the present application, there is provided a computer program product including instructions that, when executed on a computer, enable the computer to execute the paging method described in the aforementioned embodiments.

According to embodiments of the present application, there is provided a communication system, including any one of the aforementioned first terminals, any one of the aforementioned second terminals, and the network device.

The present application provides a paging method and apparatus, and a storage medium, the second terminal provides the relay service for the first terminal, the first terminal determines the sidelink paging occasion according to the DRX mechanism, and monitors the paging message on the direct communication interface through which communication with the second terminal is performed, then the monitoring of the paging message from the network device by the first terminal in the relay scenario is realized, and the power consumption of the first terminal is saved.

It should be understood that the description of the contents in the above summary does not intend to limit the key or essential features of the embodiments in the present application, nor does it limit the scope of the present application. Other features of the present application will become apparent from the following description, which makes them easily understandable.

BRIEF DESCRIPTION OF DRAWINGS

In order to clarify the embodiments of the present application, a brief introduction will be provided regarding the diagrams that are needed in the description of the embodiments. Apparently, the diagrams described below are some embodiments of the present application.

DESCRIPTION OF EMBODIMENTS

Figure 1:
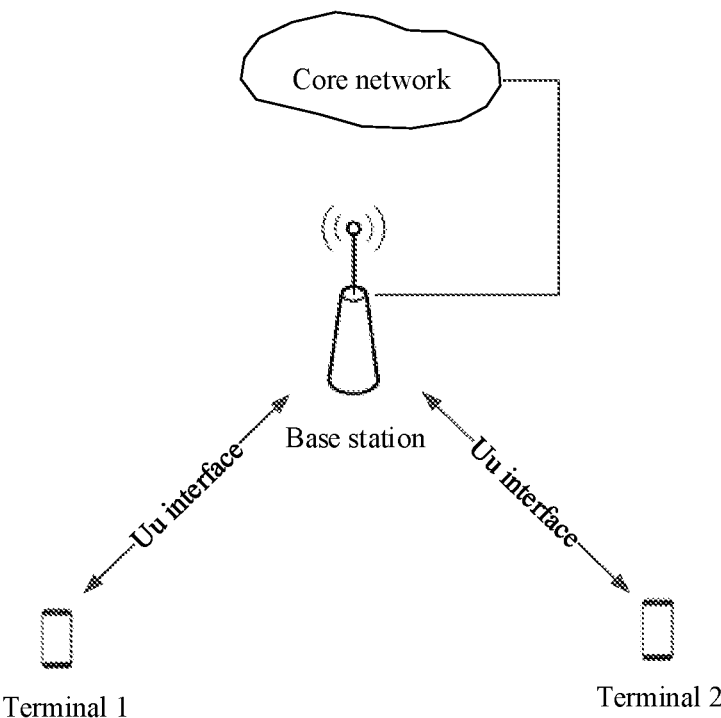
FIG. 1 is a first schematic diagram of a communication scenario provided in an embodiment of the present application.

In this application, the term "and/or" is used for describing the relationship between associated objects, indicating that there can be three possible relationships. For example, "A and/or B" can represent three situations: solely the existence of A, the simultaneous existence of A and B, or solely the existence of B. The symbol "/" generally indicates an "or" relationship between the preceding and following associated objects.

In the embodiments of the present application, the term "multiple" refers to two or more, and it similar applies to other quantifiers.

The embodiments of the present application will be clearly and fully described in conjunction with the accompanying drawings. Apparent, the described embodiments are only part of the embodiments in the present application and not all of them.

The embodiments of the present application can be applicable to various systems, especially a 5G system. For example, the applicable systems may include a global system for mobile communication (GSM), a code division multiple access (CDMA) system, a wideband code division multiple access (WCDMA) general packet radio service (GPRS) system, a long term evolution (LTE) system, an LTE frequency division duplex (FDD) system, an LTE time division duplex (time division duplex, TDD) system, an LTE-advanced (LTE-A) system, a universal mobile telecommunication system (UMTS), a worldwide interoperability for microwave access (WiMAX) system, and a 5G New Radio (NR) system. All these systems include terminals and network devices. The systems may also include a core network part, such as the evolved packet system (EPS), a 5G system (5GS), etc.

The terminal involved in the embodiments of the present application can refer to a device that provides voice and/or data connectivity to a user, a handheld device with wireless connectivity capability, or other processing device connected to a wireless modem, etc. The terminology of terminals may vary in different systems, for example, in a 5G system, the terminal can be referred to as a user equipment (UE). The terminal can communicate with one or more core networks (CN) through a radio access network (RAN), the terminal can be a mobile terminal, such as a mobile phone (also known as "cellular" phone) and a computer with a mobile terminal, such as a portable, pocket-sized, handheld, computer-integrated, or vehicle-mounted mobile device, which exchanges language and/or data with the wireless access network. For example, a personal communication service (PCS) phone, a cordless phone, session initiated protocol (SIP) phone, a wireless local loop (WLL) station, a personal digital assistant (PDA), etc. The wireless terminal can also be referred to as a system, a subscriber unit (subscriber unit), a subscriber station, a mobile station, a mobile, a remote station, an access point, a remote terminal, an access terminal, a user terminal, a user agent, a user device, etc., which is not limited in the embodiments of the present application.

The network device involved in the embodiments of the present application can be a base station, which can include multiple cells that provide service for a terminal. According to different specific application scenarios, the base station can also be referred to as an access point, or a device in an access network that communicates with a wireless terminal through one or more sectors on an air interface, or other names. The network device can be used for exchanging a received air frame with an internet protocol (P) packet, serving as a router between the wireless terminal and the rest of the access network, where the rest of the access network may include an internet protocol (IP) communication network. The network device can also coordinate the management of attributes of the air interface. For example, the network device involved in the embodiments of the present application can be a base transceiver station (BTS) in a global system for mobile communication (GSM) or code division multiple access (CDMA) system, a NodeB in a wide-band code division multiple access (WCDMA) system, an evolutional Node B (eNB or e-NodeB) in a long term evolution (LTE) system, a 5G base station (gNB) in a 5G network architecture (next generation system), a home evolved node B (HeNB), a relay node, a femto base station (femto), a pico base station (pico), etc., which is not limited in the embodiments of the present application. In some network architectures, the network device can include a centralized unit (CU) node and a distributed unit (DU) node, which can be physically deployed separately.

The multi input multi output (MIMO) transmission can be conducted between the network device and the terminal through one or multiple antennas. MIMO transmission can be single user MIMO (SU-MIMO) or multiple user MIMO (MU-MIMO). According to the configuration and number of antennas, MIMO transmission can be 2D-MIMO, 3D-MIMO, FD-MIMO, or massive-MIMO. It can also be diversity transmission, precoding transmission, or beam-forming transmission etc.

First of all, some explanations of certain communication manners and terminologies relevant to the present application are provided to facilitate understanding.

I. Communication Manner (1) Cellular Network Communication

A cellular network communication manner is adapted in traditional wireless communication. In the cellular network communication manner, the terminal and the network device perform transmission of data/control information in the uplink and downlink through an air interface (such as a Uu interface).

A communication scenario is exemplarily illustrated in FIG. 1, which is typically a cellular network communication scenario. As shown in FIG. 1, an example is taken where network devices include a base station and a core network, while terminals include a terminal 1 and a terminal 2, among them, the terminal 1 and the terminal 2 establish communication connections with the base station through Uu interfaces respectively.

(2) Direct Communication

Direct communication refers to a manner in which neighboring terminals can perform data transmission within a close range through a direct communication link (also referred to as a sidelink or PC5). A wireless interface corresponding to the direct communication link is called the direct communication interface (also referred to as a Sidelink interface or a PC5 interface).

Figure 2:
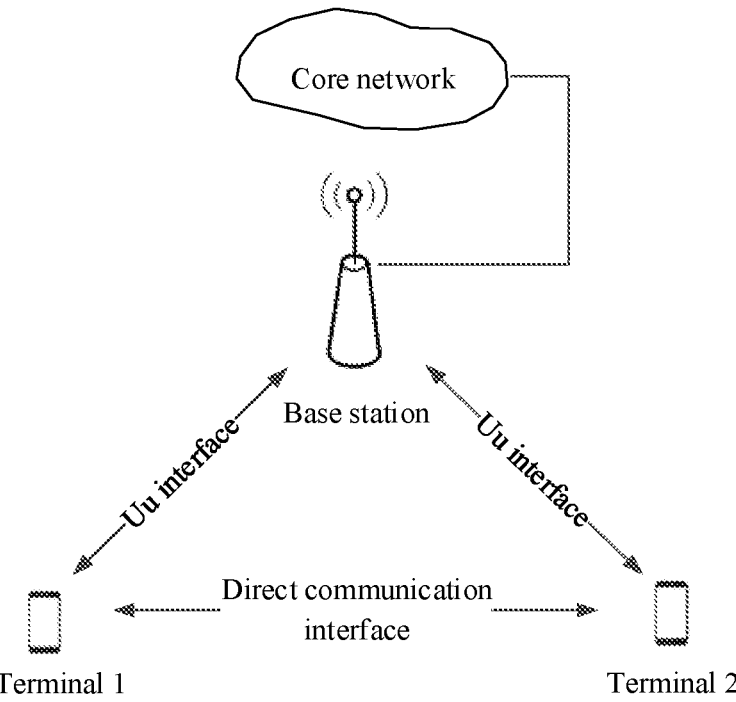
FIG. 2 is a second schematic diagram of a communication scenario provided in an embodiment of the present application.

A communication scenario is exemplarily illustrated in FIG. 2, which is typically a direct communication scenario between terminals. As shown in FIG. 2, for example, network devices include a base station and a core network, while terminals include a terminal 1 and a terminal 2, the terminal 1 and the terminal 2 establish communication connections with the base station through Uu interfaces respectively. Additionally, the terminal 1 and the terminal 2 can also communicate through the direct communication interface.

(3) Relay

In order to expand network coverage, a relay is introduced between the terminal and the network device, communication is performed between the terminal and the network device via the relay. In a relay scenario, communication between a relay terminal (a terminal with relay functionality) and the network device is performed through the air interface, while communication between the relay terminal and the relayed terminal (also known as the remote terminal) is performed through the direct communication interface, where the link between the relay terminal and the network device is referred to as a backhaul link for the relayed terminal, whereas the link between the relay terminal and the relayed terminal is the direct communication link.

Figure 3:
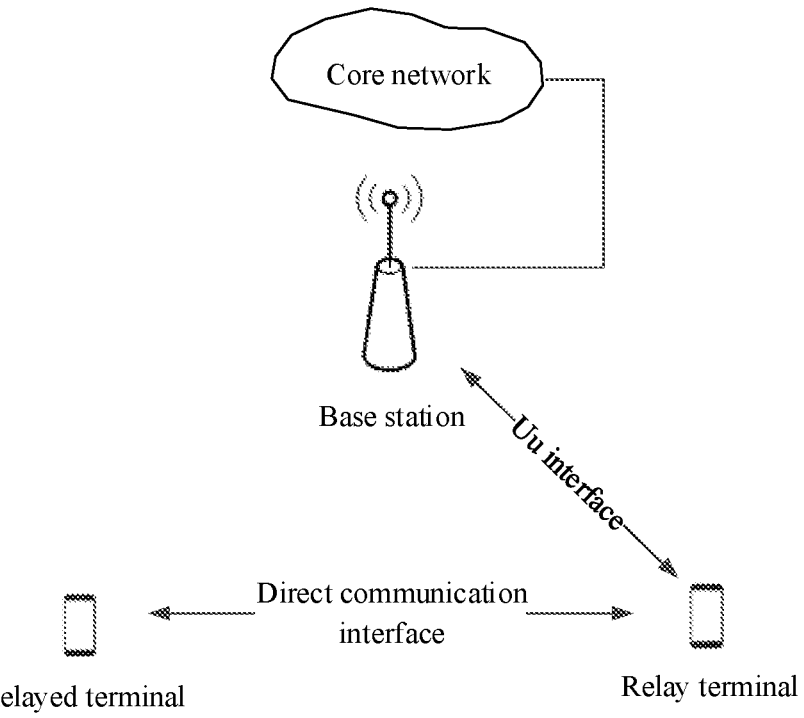
FIG. 3 is a third schematic diagram of a communication scenario provided in an embodiment of the present application.

A communication scenario is exemplarily illustrated in FIG. 3, which is typically a relay communication scenario. As shown in FIG. 3, the relay scenario includes a network device, a relay terminal, and a relayed terminal, for example, network devices include a base station and a core network, the relay terminal communicates with the network device through a Uu interface, while the relayed terminal communicates with the relay terminal through the direct communication interface.

II. Terminology (1) Paging

When radio resource control (RRC) of a terminal is in an idle (IDLE) state or inactive (INACTIVE) state, i.e., the terminal is in an RRC_IDLE state or an RRC_INACTIVE state, the network device can page the terminal, the terminal can convert from the RRC_IDLE state or the RRC_INAC-TIVE state to an RRC link active (RRC_ACTIVE) state after receiving a paging message from the network device.

(2) Discontinuous reception (DRX) mechanism: In the DRX mechanism, a terminal can monitor the paging message on the air interface during the paging occasion (s) (PO) within each paging cycle.

(3) Paging cycle: in the DRX mechanism, for a receiving end (e.g., the terminal), the paging cycle is also referred to as a discontinuous reception cycle (DRX cycle for short), it is used for indicating that the receiving end monitors the paging message in every other paging cycle: for a transmitting end (e.g., the network device), the DRX mechanism corresponds to a discontinuous transmission (DTX) mechanism, the paging cycle is referred to as a discontinuous transmission cycle (DTX cycle for short), it is used for indicating that the transmitting end transmits the paging message according to the paging cycle.

(4) Paging Frame (PF): one paging cycle includes one or more paging frames, a paging frame is a wireless frame that includes multiple subframes, a paging frame can include one or more paging occasions, or, a paging frame can include a starting point of a paging occasion.

(5) Paging Occasion (PO): a collection of monitoring occasions for a physical downlink control channel (PDCCH), it can include multiple time slots. In the paging occasion, the terminal monitors the paging message on the paging occasion(s) of each paging cycle. If there are multiple paging occasions within one paging cycle, the terminal can be paged multiple times within one paging cycle, a success rate of paging is thus increased.

(6) System Frame Number (SFN): a wireless frame number at the air interface, for example, the wireless frame number at the Uu interface.

(7) Direct Frame Number (DFN): a wireless frame number on the direct communication interface.

(8) First terminal: a terminal being relayed (relayed terminal) in the relay scenario, also known as a remote terminal.

(9) Second terminal: a terminal in the relay scenario that provides the relay service to the first terminal;

where the second terminal communicates with the first terminal through the direct communication interface, while the second terminal communicates with the network device through the air interface.

(10) Sidelink paging occasion (SLPO): an occasion when the first terminal monitoring the paging message on the direct communication interface for communicating with the second terminal, also an occasion that the second terminal should follow for transmitting the paging message on the direct communication interface, the paging message refers to a message from the network device for paging the first terminal.

(11) Air interface paging occasion: an occasion that the second terminal monitors the paging message from the network device for paging the first terminal on the air interface, also an occasion that the network device should follow for paging the first terminal on the air interface.

(12) First offset value: an offset of a paging frame corresponding to the direct communication interface between the first terminal and the second terminal, in other words, a first offset value is an offset used for measurement and determination of the paging frame when monitoring or transmitting the paging message(s) on the direct communication interface.

(13) Second offset value: an offset of a paging frame corresponding to the air interface between the network device and the terminal, in other words, a second offset value is an offset used for measurement and determination of the paging frame when monitoring or transmitting the paging message(s) on the air interface.

(14) Inter-interface wireless frame deviation: a time deviation between an SFN of the air interface and a DFN of the direct communication interface, the value of this deviation is related to a clock synchronization source of the direct communication interface.

(15) Identifier of a terminal: it is used for differentiating different terminals.

In one embodiment, the identifier of the terminal is determined according to a terminal mobile subscriber identity (TMSI). For example, the identifier of the terminal is obtained by performing a modulo operation (also known as mod operation) on the TMSI with 1024.

In one embodiment, if the first terminal is not registered on the network, its identifier is set to a default value, such as zero.

In a communication scenario without the relay, a terminal in the RRC_IDLE state or the RRC_INACTIVE state can use the discontinuous reception (Discontinuous Reception, DRX) mechanism to monitor the paging message from the network device for paging this terminal on the air interface.

In a communication scenario with the relay, a relay terminal simultaneously monitors the paging message from the network device for paging the relay terminal and the paging message from the network device for paging the relayed terminal on the air interface, if the monitored paging message is from the network device for paging the relayed terminal, then the paging message needs to be forwarded to the relayed terminal. Currently, most paging monitoring schemes focus on the air interface, and there are no specific solutions available yet to address how the relayed terminal can monitor the paging message.

In order to address the above-mentioned issue, embodiments of the present application provide a paging method and apparatus, and a storage medium. In the present application, the first terminal determines, according to the DRX mechanism, an occasion for monitoring a paging message on a direct communication interface for communicating with the second terminal, the first terminal monitors the paging message from the network device on the direct communication interface according to the determined occasion. Then the monitoring of the paging message by the relayed terminal (i.e., the first terminal) in the relay scenario is realized, in addition, the power consumption of monitoring the paging message by the relayed terminal is reduced.

Among them, the method and apparatus provided in the embodiments of the present application are based on the same concept, due to the similarity in the principles for solving the problem according to the method and apparatus, reference can be made to each other for the implementations of the method and apparatus, and details will not be repeated.

Figure 4:
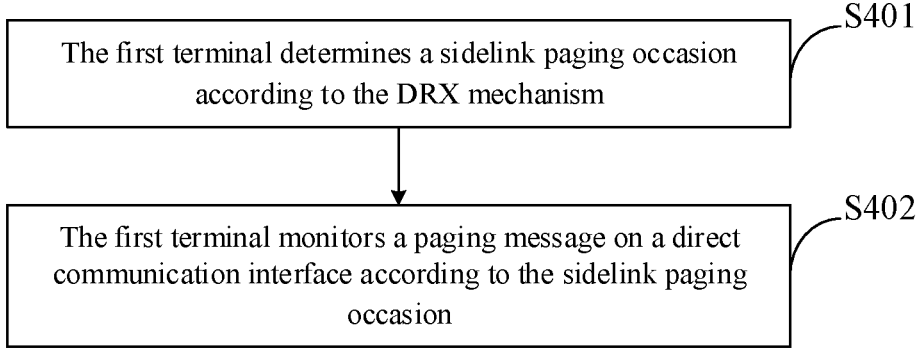
FIG. 4 is a schematic flowchart of a paging method provided in an embodiment of the present application.

FIG. 4 is a schematic flowchart of a paging method provided in an embodiment of the present application, as shown in FIG. 4, the paging method includes the following.

S401, the first terminal determines a sidelink paging occasion according to the DRX mechanism.

In this step, when the DRX mechanism is used for determining the paging occasion, one or more paging occasions of the terminal in each paging cycle can be determined. Therefore, when the sidelink paging occasion for the terminal is determined according to the DRX mechanism, one or more sidelink paging occasions of the first terminal in each paging cycle can be determined.

S402, the first terminal monitors a paging message on a direct communication interface according to the sidelink paging occasion.

In this step, after determining one or more sidelink paging occasions in each paging cycle, the first terminal monitors, in each sidelink paging occasion, the paging message forwarded by the second terminal from the network device on the direct communication interface. Among them, if receiving the paging message from the network device for paging the first terminal, the second terminal transmits the paging message to the first terminal through the direct communication interface in the sidelink paging occasion(s).

In the embodiments of the present application, in the relay scenario, the first terminal which is regarded as a relayed device determines one or more sidelink paging occasions within each paging cycle according to the DRX mechanism, and monitors, in each sidelink paging occasion, the paging message forwarded by the second terminal from the network device on the direct communication interface. Therefore, the monitoring of the paging message by the relayed terminal in the relay scenario is realized, and the relay device does not need to monitor the paging message in real time, thus effectively reducing the power consumption of monitoring the paging message in the relay scenario.

Figure 5:
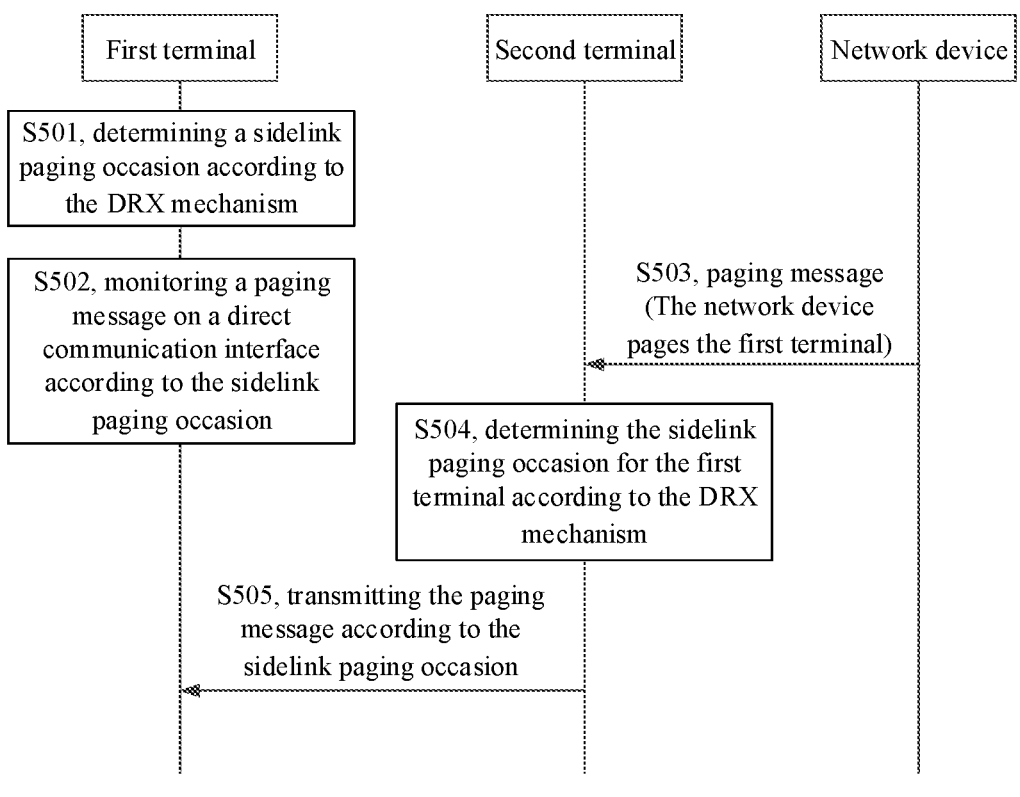
FIG. 5 is a schematic flowchart of a paging method provided in another embodiment of the present application.

FIG. 5 is a schematic flowchart of a paging method provided in another embodiment of the present application. As shown in FIG. 5, the method includes the following.

S501, the first terminal determines a sidelink paging occasion according to the DRX mechanism.

S502, the first terminal monitors a paging message on a direct communication interface according to the sidelink paging occasion.

Among them, for the implementation principles and effects of S501 and S502, reference can be made to the above embodiments.

S503, the second terminal receives the paging message from the network device for paging the first terminal.

In this step, the second terminal monitors the paging message from the network device for paging the first terminal on the air interface. When the network device transmits the paging message through the air interface, the second terminal receives the paging message.

Among them, when the second terminal monitors the paging message from the network device for paging the first terminal on the air interface, for example, a real-time monitoring and a fixed time monitoring can be used, or, In one embodiment, the second terminal determines the air interface paging occasion according to the DRX mechanism, and monitors the paging message on the air interface according to the air interface paging occasion to save the power consumption of the second terminal.

S504, the second terminal determines the sidelink paging occasion for the first terminal according to the DTX mechanism.

In this step, after receiving the paging message from the network device for paging the first terminal, the second terminal determines a paging cycle for the first terminal that is closest to the current time according to the DTX mechanism, and determines the sidelink paging occasion(s) in this paging cycle.

S505, the second terminal transmits the paging message to the first terminal through the direct communication interface according to the sidelink paging occasion.

In this step, after determining the sidelink paging occasion(s), the second terminal forwards the paging message from the network for paging the first terminal to the first terminal through the direct communication interface in the sidelink paging occasion(s). After receiving the paging message, the first terminal changes its state from the RCC_IDLE state or the RCC_INACTIVE state to the RCC_ACTIVE state, and then performs uplink and downlink communication with the network device.

In the embodiments of the present application, in the relay scenario, the first terminal monitors the paging message on the direct communication interface according to the sidelink paging occasion(s), after the second terminal receives the paging message from the network device for paging the first terminal, the second terminal determines the sidelink paging occasion(s), and forwards the paging message to the first terminal according to the sidelink paging occasion(s). Therefore, the monitoring and transmission of the paging message for the relayed terminal in the relay scenario are realized, and the relayed device does not need to monitor the paging message in real time, thus effectively reducing the power consumption of monitoring the paging message in the relay scenario.

When determining the paging occasion by using the DRX mechanism, it is necessary to take into account multiple configured paging parameters.

Therefore, in some embodiments, when the sidelink paging occasion is determined according to the DRX mechanism, the sidelink paging occasion can also be determined according to multiple configured paging parameters (the paging parameters used for determining the sidelink paging occasion are referred to as "first paging parameter" for the purpose of distinguishment).

Similarly, in some embodiments, when determining the air interface paging occasion according to the DRX mechanism, the second terminal can also determine the air interface paging occasion according to multiple configured paging parameters (the paging parameters used for determining the air interface paging occasion are referred to as "second paging parameter" for the purpose of distinguishment).

In one example, the first paging parameter includes a paging cycle, the number of paging frames in a single paging cycle, a first offset, and an identifier of the first terminal. Among them, different first terminals have the same paging cycle, the same number of paging frames in the single paging cycle, and the same first offset, but different identifiers. Therefore, sidelink paging occasions for different first terminals can be distinguished according to identifiers of different first terminals.

In one embodiment, in the case where the first paging parameter includes the paging cycle, the number of paging frames in the single paging cycle, the first offset, and the identifier of the first terminal, the sidelink paging occasion includes a DFN of a paging frame within the paging cycle. In this scenario, the process of determining the sidelink paging occasion according to the first paging parameter includes: determining the DFN of the paging frame within the paging cycle according to the paging cycle, the number of paging frames in the single paging cycle, the first offset, and the identifier of the first terminal. Therefore, the first terminal can monitor the paging message on the direct communication interface according to the DFN of the paging frame within the paging cycle, and the second terminal can forward the paging message to the first terminal on the direct communication interface according to the DFN of the paging frame in the paging cycle after receiving the paging message from the network device for paging the first terminal.

In one embodiment, regarding the monitoring or transmission of the paging message on the direct communication interface, the formula for determining the DFN of the paging frame within the paging cycle can be expressed as: $(DFN + SLPF\_offset) \bmod T = (T \operatorname{div} N)*(UE\_ID \bmod N)$.

Among them, SLPF_offset represents the first offset, T represents the paging cycle, N represents the number of paging frames in the single paging cycle, UE_ID represents the identifier of the first terminal, the 'div' operation represents the integer division (dividable with no reminder), and the 'mod' operation represents the modulo operation.

In another example, in addition to the paging cycle, the number of paging frames in the single paging cycle, the first offset, and the identifier of the first terminal, the first paging parameter may further include the number of paging times in the single paging cycle. Among them, the number of paging times in the single paging cycle is the number of repetitive transmissions of the paging message in the single paging cycle. Assuming that the number of paging times in the single paging cycle is Ns, the first terminal can be paged Ns times within the single paging cycle, i.e., there can be Ns transmissions of the paging message between the second terminal and the first terminal for improving the success rate of the paging.

In one embodiment, the sidelink paging occasion includes the occasion of each paging in the paging cycle. In this scenario, the process of determining the sidelink paging occasion according to the first paging parameter includes:

determining a DFN of a paging frame within the paging cycle according to the paging cycle, the number of paging frames in the single paging cycle, the first offset, and the identifier of the first terminal: determining a DFN corresponding to a first paging within the paging cycle according to the number of paging frames in the single paging cycle, the number of paging times in the single paging cycle, and the identifier of the first terminal: determining the occasion of each paging within the paging cycle according to the DFN of the paging frame within the paging cycle and the DFN corresponding to the first paging within the paging cycle.

Therefore, the first terminal monitors the paging message on the direct communication interface according to the occasion of each paging in the paging cycle, after the second terminal receives the paging message from the network device for paging the first terminal, the second terminal may forward the paging message to the first terminal on the direct communication interface according to the occasion of each paging in the paging cycle.

Among them, regarding the monitoring or transmission of the paging message on the direct communication interface, the determination of the DFN of the paging frame within the paging cycle according to the paging cycle, the number of paging frames in a single paging cycle, the first offset, and the identifier of the first terminal, may be done by using the previously mentioned formulas, which is not repeated here.

In one embodiment, regarding the monitoring or transmission of the paging message on the direct communication interface, the formula for determining the DFN corresponding to the first paging in the paging cycle according to the number of paging frames in the single paging cycle, the number of paging times in the single paging cycle, and the identifier of the first terminal can be expressed as:

i_s=floor(UE_ID/N) mod Ns, where the floor function denotes rounding down, Ns represents the number of paging times in the single paging cycle, i_s represents a position of a sub-frame corresponding to the first paging in the paging frame, thus the DFN corresponding to the first paging can be determined, i.e., the occasion of the first paging is determined.

Remaining occasions of paging are determined according to the DFN of the paging frame within the paging cycle and the DFN corresponding to the first paging in the paging cycle, for example, using a fixed time interval to determine the remaining paging occasions. Therefore, the occasion for each paging is obtained.

As an example, after transmitting the paging message to the first terminal for the first time, the second terminal can give indication of temporal information of the repeated paging message(s) to the first terminal through a time resource assignment (Time resource assignment) through a serial communication interface (Serial Communication Interface, SCI).

In an example, the second paging parameter includes the paging cycle, the number of paging frames in the single paging cycle, a second offset, the identifier of the first terminal, and the number of paging times in the single paging cycle. The first paging parameter is compared with the second paging parameter, where the paging cycle, the number of paging frames in the single paging cycle, the identifier of the first terminal, and the number of paging times in the single paging cycle are all the same. The process of determining the air interface paging occasion according to the second paging parameter include:

regarding the monitoring or transmission of the paging message on the air interface, determining an SFN of a paging frame within the paging cycle according to the paging cycle, the number of paging frames in the single paging cycle, the second offset, and the identifier of the first terminal: determining an SFN corresponding to the first paging within the paging cycle according to the number of paging frames in the single paging cycle, the number of paging times in the single paging cycle, and the identifier of the first terminal; determining the occasion of each paging within the paging cycle according to the SFN of the paging frame within the paging cycle and the SFN corresponding to the first paging within the paging cycle.

In one embodiment, regarding the monitoring or transmission of the paging message on the air interface, the formula for determining the SFN of the paging frame within the paging cycle can be expressed as: (SFN+PF_offset) mod T=(T div N)*(UE_ID mod N).

Among them, PF_offset represents the second offset, T represents the paging cycle, N represents the number of paging frames in a single paging cycle, and UE_ID represents the identifier of the first terminal.

In one embodiment, regarding the monitoring or transmission of the paging message on the air interface, for the formula for determining the SFN corresponding to the first paging in the paging cycle, reference can be made to the formula for determining the DFN corresponding to the first paging in the paging cycle which aims at the monitoring or transmission of the paging message on the direct communication interface, which will not be repeated here.

In one example, based on the first paging parameter including the paging cycle, the number of paging frames in the single paging cycle, the first offset, and the identifier of the first terminal, or based on the first paging parameter including the paging cycle, the number of paging frames in the single paging cycle, the number of paging times in the single paging cycle, the first offset, and the identifier of the first terminal, the first paging parameter further includes at least one of the following: the second offset or an inter-interface wireless frame deviation, the rationality of determining the sidelink paging occasion according to the first paging parameter is further improved, thus the efficiency and effectiveness of paging are enhanced.

In one embodiment, when determining the sidelink paging occasion according to the first paging parameter, the SFN of the paging frame within the paging cycle can be determined according to the paging cycle, the number of paging frames in the single paging cycle, the first offset, and the identifier of the first terminal, as well as at least one of the second offset or the inter-interface wireless frame deviation. If the first paging parameter also includes the number of paging frames in the single paging cycle, the occasion of each paging within the paging cycle can also be determined. The introductions of the second offset and the inter-interface wireless frame deviation in the first paging parameter are described respectively below.

(1) The second offset is introduced into the first paging parameter

If the air interface paging occasion determined based on the DRX mechanism is consistent with the sidelink paging occasion determined based on the DRX mechanism, then after the second terminal receives the paging message from the network device for paging the first terminal in a paging cycle, it may not be able to immediately transmit the paging message to the first terminal via the direct communication interface in this paging cycle due to time delay, but needs to wait for the next paging cycle, thus further increasing the duration between the reception of the paging message by the second terminal and the transmission of the paging message by the second terminal to the first terminal, and the efficiency and effectiveness of paging are thus affected. In order to avoid the above phenomenon, the following approach can be adopted.

One possible implementation: the sidelink paging occasion is related to the second offset, in other words, the sidelink paging occasion is determined by adding the first offset to the second offset, at this moment, the air interface paging occasion uses simply the second offset, while the sidelink paging occasion uses both the first offset and the second offset, thus causing the air interface paging occasion and the sidelink paging occasion to be staggered. After the second terminal receives the paging message from the network device for paging the first terminal in a paging cycle on the air interface, it can transmit the paging message to the first terminal in a paging cycle of the direct communication interface that is close in time, without waiting for a full cycle, thus both the efficiency and effectiveness of the paging are improved.

When the sidelink paging occasion is related to the second offset, based on the first paging parameter including the paging cycle, the number of paging frames in a single paging cycle, the first offset, the second offset, and the identifier of the first terminal. At this time, the sidelink paging occasion includes the SFN of the paging frame within the paging cycle, which can be determined according to the paging cycle, the number of paging frames in the single paging cycle, the first offset, the second offset, and the identifier of the first terminal.

In one embodiment, regarding the monitoring or transmission of the paging message on the direct communication interface, the formula for determining the SFN of the paging frame within the paging cycle according to the paging cycle, the number of paging frames in the single paging cycle, the first offset, the identifier of the first terminal, and the second offset can be expressed as: (SFN+SLPF_offset+PF_offset) mod T=(T div N)*(UE_ID mod N).

In one embodiment, when the first paging parameter includes the paging cycle, the number of paging frames in the single paging cycle, the number of paging times in the single paging cycle, the first offset, the second offset, and the identifier of the first terminal, the sidelink paging occasion includes the occasion of each paging occasion in the paging cycle. At this time, the occasion of each paging in the paging cycle can be determined according to the first paging parameter.

In one embodiment, after the SFN of the paging frame within the paging cycle is determined according to the paging cycle, the number of paging frames in the single paging cycle, the first offset, the identifier of the first terminal, and the second offset, the SFN corresponding to the first paging in the paging cycle can be determined according to the number of paging frames in the single paging cycle, the number of paging times in the single paging cycle, and the identifier of the first terminal, thus the occasion of each paging in the paging cycle is further determined. Among them, regarding the monitoring or transmission of the paging message on the direct communication interface, for the determination of the SFN corresponding to the first paging in the paging cycle, reference can be made to the aforementioned relevant formula, which will not be repeated here.

Another possible implementation: the sidelink paging occasion is unrelated to the second offset and the first offset is not equal to the second offset, in this way, the air interface paging occasion and the sidelink paging occasion are staggered since the first offset and the second offset are not equal. After the second terminal receives the paging message from the network device for paging the first terminal in a paging cycle of the air interface, it can transmit the paging message to the first terminal in the paging cycle of the direct communication interface that is close in time, without waiting for a full cycle, thus both the efficiency and effectiveness of the paging are improved. At this time, the first paging parameter does not include the second offset, in other words, the value of the second offset in the first paging parameter is zero.

(2) The inter-interface wireless frame deviation is introduced into the first paging parameter Considering that there is a possible deviation between the SFN of the air interface and the DFN of the direct communication interface, the second terminal needs to determine the sidelink paging occasion according to the DFN of the direct communication interface after receiving the paging message from the network device for paging the first terminal on the air interface. In order to reduce the time error caused by the time deviation between the SFN of the air interface and the DFN of the direct communication interface in this process, the inter-interface wireless frame deviation can be introduced into the first paging parameter. Among them, the inter-interface wireless frame deviation is used for representing the time deviation between the SFN of the air interface and the DFN of the direct communication interface.

In one embodiment, the existence of the time deviation between the SFN of the air interface and the DFN of the direct communication interface is mainly due to the difference in the clock synchronization source of the air interface and the clock synchronization source of the direct communication interface. The clock synchronization source of the air interface is usually the network device, therefore, if the clock synchronization source of the direct communication interface is the network device, the first paging parameter does not include the inter-interface wireless frame deviation, or the value of the inter-interface wireless frame deviation in the first paging parameter is zero. If the clock synchronization source of the direct communication interface is a satellite, the first paging parameter includes the inter-interface wireless frame deviation, whose value is the actual value of time deviation between the SFN of the air interface and the DFN of the direct communication interface.

In one embodiment, the first paging parameter includes the paging cycle, the number of paging frames in the single paging cycle, the first offset, the inter-interface wireless frame deviation, and the identifier of the first terminal: or, the first paging parameter includes the paging cycle, the number of paging frames in the single paging cycle, the first offset, the second offset, the inter-interface wireless frame deviation, and the identifier of the first terminal: or, the first paging parameter includes the paging cycle, the number of paging frames in a single paging cycle, the number of paging times in the single paging cycle, the first offset, the inter-interface wireless frame deviation, and the identifier of the first terminal; or, the first paging parameter includes the paging cycle, the number of paging frames in the single paging cycle, the number of paging times in the single paging cycle, the first offset, the second offset, the inter-interface wireless frame deviation, and the identifier of the first terminal.

Taking the case where the first paging parameter includes the paging cycle, the number of paging frames in a single paging cycle, the number of paging times in the single paging cycle, the first offset, the second offset, the inter-interface wireless frame deviation, and the identifier of the first terminal as an example: when the sidelink paging occasion is determined according to the first paging parameter, the SFN of the paging frame within the paging cycle can be determined according to the paging cycle, the number of paging frames in the single paging cycle, the first offset, the second offset, the inter-interface wireless frame deviation and the identifier of the first terminal: then, the SFN corresponding to the first paging in the paging cycle is determined according to the number of paging frames in the single paging cycle, the number of paging times in the single paging cycle, and the identifier of the first terminal, and the occasion of each paging cycle is further determined. Among them, In one embodiment, the formula for determining the SFN of the paging frame within the paging cycle according to the paging cycle, the number of paging frames in the single paging cycle, the first offset, the second offset, the inter-interface wireless frame deviation, and the identifier of the first terminal is expressed as: $(SFN+DFN\_SFN\_offset+SLPF\_offset+PF\_offset) \bmod T=(T \operatorname{div} N)*(UE\_ID \bmod N)$.

Among them, DFN_SFN_offset represents the inter-interface wireless frame deviation.

In some embodiments, the configuration of the first offset, the inter-interface wireless frame deviation in the first paging parameter, and/or whether the sidelink paging occasion is related to the second offset, includes at least one of the following manners:

manner 1: when the first terminal and the second terminal establish a sidelink connection or after the first terminal and the second terminal establish a sidelink connection, the second terminal transmits a configuration message to the first terminal through the direct communication interface, to instruct the first terminal to execute the configuration;

manner 2: configuring the value of the first offset, the value of the inter-interface wireless frame deviation, and/or whether the sidelink paging occasion is related to the second offset in pre-configuration information of the first terminal;

manner 3: configuring the value of the first offset, the value of the inter-interface wireless frame deviation, and/or whether the sidelink paging occasion is related to the second offset in a default parameter of a communication protocol;

manner 4: specifying the value of the first offset, the value of the inter-interface wireless frame deviation, and/or whether the sidelink paging occasion is related to the second offset in a communication protocol.

Figure 6:
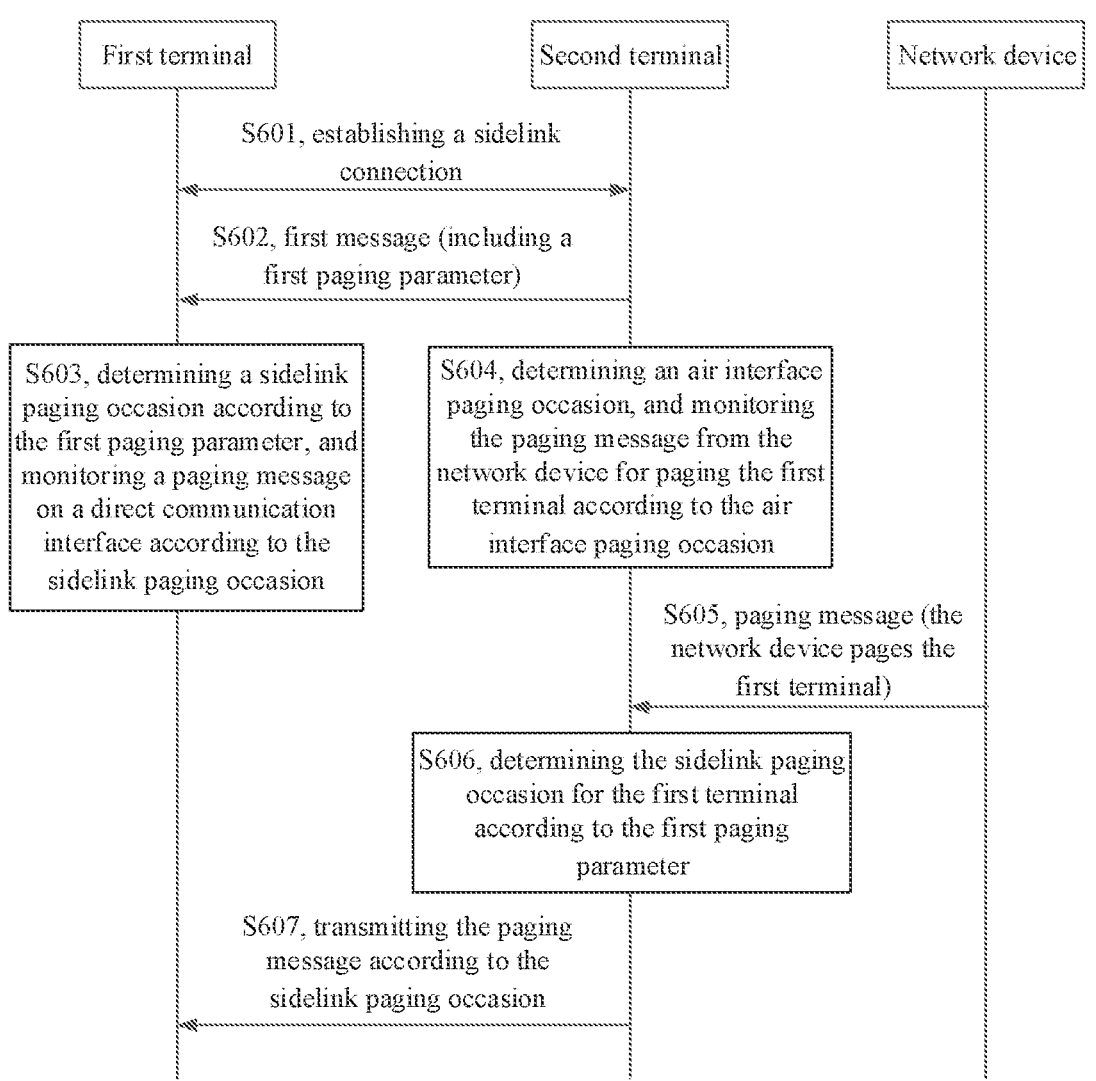
FIG. 6 is a schematic flowchart of a paging method provided in another embodiment of the present application.

According to the above-mentioned manner 1, FIG. 6 is a schematic flowchart of a paging method provided in another embodiment of the present application. As shown in FIG. 6, the method includes the following.

S601, the first terminal and the second terminal establish a sidelink connection.

S602, the second terminal transmits a first message to the first terminal, where the first message includes the first paging parameter.

In this step, when the first terminal and the second terminal establish the sidelink connection or after the first terminal and the second terminal establish the sidelink connection, the second terminal transmits the first message to the first terminal, the first message includes the first paging parameter. Since the first terminal knows its own identifier, the first paging parameter in the first message does not include the identifier of the first terminal, reference can be made to the relevant contents in the preceding embodiments for the remaining contents of the first paging parameter.

Among them, the message form of the first message is such as a signaling message of the direct communication interface-direct communication link layer (PC5-S for short), a signaling message of the direct communication interface-wireless resource control layer (PC5-RRC for short), a signaling message of a control element (CE) on the media access control layer (MAC), or a signaling message of downlink control information (DCI).

In one example, the first message can also be used for indicating whether the sidelink paging occasion is related to the second offset. In this case, the second terminal can add the first offset and the indication of whether the sidelink paging occasion is related to the second offset or not based on the second paging parameter configured for the air interface by the network device. In one embodiment, the inter-interface wireless frame deviation can also be added.

In one embodiment, if the first message indicates that the sidelink paging occasion is related to the second offset, the first paging parameter configured for the second terminal includes the second offset: if the first message indicates that the sidelink paging occasion is unrelated to the second offset, the first paging parameter configured for the second terminal does not include the second offset, or the first paging parameter configured for the second terminal includes the second offset, but the value of the second offset in the first paging parameter is zero.

In another example, the second terminal can directly determine that the sidelink paging occasion is unrelated the second offset, and the first paging parameter transmitted to the first terminal through the first message does not include the second offset, in this case, there is no need to give indication to the first terminal through the first message about whether the sidelink paging occasion is related to the second offset or not.

S603, the first terminal determines a sidelink paging occasion according to the first paging parameter, and monitors a paging message on a direct communication interface according to the sidelink paging occasion.

In this step, after receiving the first message, the first terminal can determine the sidelink paging occasion according to the first paging parameter in the first message, or, if there is an indication in the first message about whether the sidelink paging occasion is related to the second offset or not, then the first terminal can also determine the sidelink paging occasion according to this indication in combination with the first paging parameter, and monitor the paging message according to the sidelink paging occasion on the direct communication interface.

Among them, for the determination of the sidelink paging occasion, reference can be made to the above-mentioned embodiments, which will not be repeated here.

S604, the second terminal determines an air interface paging occasion, and monitors the paging message from the network device for paging the first terminal on the air interface according to the air interface paging occasion.

In this step, the second terminal determines the air interface paging occasion, i.e., the occasion of monitoring the paging message from the network device for paging the first terminal, and monitors the paging message from the network device for paging the first terminal on the air interface according to the air interface paging occasion.

In one example, the second terminal can determine the air interface paging occasion according to the second paging parameter. Among them, reference can be made to the above-mentioned embodiments for the determination of the air interface paging occasion according to the second paging parameter, which will not be repeated here.

In another example, the second terminal may receive a second message from the first terminal before determining the air interface paging occasion, where the second message includes the air interface paging occasion and/or the identifier of the first terminal. If the second message includes the air interface paging occasion, the second terminal can directly obtain the air interface paging occasion from the second message without having to determine the air interface paging occasion according to the second paging parameter. If the second message includes the identifier of the first terminal, the second terminal can obtain the second paging parameter based on the combination of the identifier of the first terminal, the number of paging frames in the paging cycle, the number of paging times in the paging cycle, the second offset and the paging cycle configured for the air interface by the network device, and then determine the air interface paging occasion according to the second paging parameter.

S605, the second terminal receives the paging message from the network device for paging the first terminal.

In this step, the second terminal receives the paging message from the network device for paging the first terminal in the progress of monitoring the paging message from the network device for paging the first terminal according to the determined air interface paging occasion.

S606, the second terminal determines the sidelink paging occasion for the first terminal according to the first paging parameter.

S607, the second terminal transmits the paging message to the first terminal according to the sidelink paging occasion.

In this step, the second terminal determines the sidelink paging occasion according to the first paging parameter, reference can be made to the preceding embodiments for this progress and details are not repeated here. After receiving the paging message from the network device for paging the first terminal, the second terminal transmits the paging message to the first terminal through one or more subchannels of the direct communication interface according to the sidelink paging occasion.

In one example, if the second terminal receives the second message from the first terminal, which includes the air interface paging occasion and/or the identifier of the first terminal, the second terminal can determine the sidelink paging occasion according to the air interface paging occasion and/or the identifier of the first terminal.

Among them, if the second message includes the air interface paging occasion, the second terminal can obtain the air interface paging occasion from the second message, and obtain the sidelink paging occasion by adding, on the basis of the air interface paging occasion, the first offset and further the inter-interface wireless frame deviation.

Among them, if the second message includes the identifier of the first terminal, the second terminal can obtain the first paging parameter by combining the identifier of the first terminal with the paging cycle, the number of paging frames in the paging cycle, the number of paging times in the paging cycle, the first offset and the like preconfigured for the direct communication interface, and then determine the sidelink paging occasion according to the first paging parameter.

In some embodiments, after receiving the paging message from the network device for paging the first terminal, the second terminal transmits the paging message to the first terminal through one or more paging subchannels configured in the direct communication interface according to the sidelink paging occasion. Therefore, the purpose of saving channel resources is achieved by designating a part of subchannels of the direct communication interface as the paging subchannel(s), the first terminal does not need to monitor all the subchannels of the direct communication interface, and the second terminal does not need to transmit the paging message to the first terminal through all the subchannels of the direct communication interface, thus reducing the power consumption of the terminal.

In some embodiments, the first message is further used for indicating one or more paging subchannels among multiple subchannels of the direct communication interface. Among them, the paging subchannel is used for transmitting the paging message. Therefore, the purpose of saving channel resources is achieved by designating a part of subchannels of the direct communication interface as the paging subchannel(s), the first terminal does not need to monitor all the subchannels of the direct communication interface, and the second terminal does not need to transmit the paging message to the first terminal through all the subchannels of the direct communication interface, thus reducing the power consumption of the terminal.

In one embodiment, after receiving the first message, the first terminal can monitor the paging message in one or more paging subchannels of the direct communication interface according to the determined sidelink paging occasion. After receiving the paging message from the network device for paging the first terminal, the second terminal can transmit the paging message through one or more paging subchannels of the direct communication interface according to the determined sidelink paging occasion.

In some embodiments, the paging message transmitted by the second terminal to the first terminal through the direct communication interface includes the identifier of the first terminal, and the first terminal can determine whether the paging message is the paging message from the network device for paging the first terminal according to the identifier of the terminal in the paging message.

Figure 7:
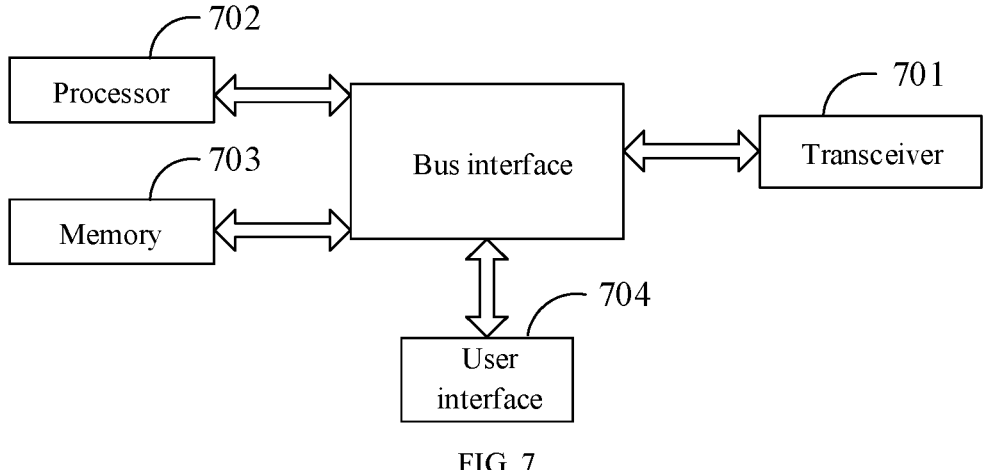
FIG. 7 is a schematic structural diagram of a paging apparatus provided in an embodiment of the present application.

On the terminal side, an embodiment of the present application provides a paging apparatus, as shown in FIG. 7, the paging apparatus of the present embodiment can be a terminal, and the paging apparatus may include a transceiver 701, a processor 702, and a memory 703.

The transceiver 701 is configured to receive and transmit data under the control of the processor 702.

In FIG. 7, a bus architecture can include any number of interconnected buses and bridges, In one embodiment, linked together by one or more processors represented by the processor 702 and various circuits of memory represented by the memory 703. The bus architecture can also link together various other circuits, such as a peripheral, a voltage regulator, and a power management circuit, which are well known in the field and are therefore not described further in herein. Bus interface provides an interface. The transceiver 701 can be multiple elements, i.e., including a transmitter and a receiver, providing a device for communication with various other devices on a transmission medium, the transmission medium includes a wireless channel, a wired channel, and an optical cable and so on. In one embodiment, the paging apparatus can also include a user interface 704, for different user devices, the user interface 704 can also be an interface may connect with a required device in an external or internal mode, the connected devices include but not limited to a keypad, a display, a speaker, a microphone, a joystick, etc.

The processor 702 is responsible for managing the bus architecture and general processing, and the memory 703 can store data used by the processor 702 when performing operations.

In one embodiment, the processor 702 can be a central processing unit (CPU), an application specific integrated circuit (ASIC), a field-programmable gate array (FPGA), or a complex programmable logic device (CPLD), a multi-core architecture can also be adopted by the processor 702.

The processor 702 is configured to execute, by invoking a computer program stored in the memory 703, any of the methods provided in the embodiments of the present application with respect to the first terminal in accordance with the obtained executable instructions. The processor 702 and the memory 703 can also be physically separated.

In one embodiment, the processor 702 performs the following operations when executing the computer program stored in the memory 703: determining a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal: monitoring the paging message on the direct communication interface according to the sidelink paging occasion.

In one embodiment, the processor 702 further performs the following operations: determining the sidelink paging occasion according to a first paging parameter: where the first paging parameter includes at least one of a paging cycle, a number of paging frames in a single paging cycle, a first offset, or an identifier of the first terminal: the first offset is an offset of a paging frame corresponding to the direct communication interface.

In one embodiment, the first paging parameter further includes at least one of a second offset or an inter-interface wireless frame deviation, where the second offset is an offset of a paging frame corresponding to an air interface for communication between the network device and a terminal, and the inter-interface wireless frame deviation is a time deviation between an SFN of the air interface and a DFN of the direct communication interface.

In one embodiment, the processor 702 further performs the following operations: determining an SFN of a paging frame within the paging cycle according to the paging cycle, the number of paging frames in the single paging cycle, the first offset, the identifier of the first terminal, and/or at least one of the second offset or the inter-interface wireless frame deviation.

In one embodiment, if a clock synchronization source of the direct communication interface is the network device, a value of the inter-interface wireless frame deviation is zero; or, if a clock synchronization source of the direct communication interface is a satellite, a value of the inter-interface wireless frame deviation is an actual value of the time deviation between the SFN of the air interface and the DFN of the direct communication interface.

In one embodiment, the first paging parameter further includes a number of paging times in a single paging cycle, and the sidelink paging occasion includes an occasion of each paging within the paging cycle: the processor 702 further performs the following operations: determining an SFN of a paging frame within the paging cycle according to the paging cycle, the number of paging frames in the single paging cycle, the first offset, and the identifier of the first terminal: determining an SFN corresponding to a first paging within the paging cycle according to the number of paging frames in the single paging cycle, the number of paging times in the single paging cycle, and the identifier of the first terminal: determining the occasion of each paging within the paging cycle according to the SFN of the paging frame within the paging cycle and the SFN corresponding to the first paging within the paging cycle.

In one embodiment, the processor 702 further performs the following operations: monitoring the paging message on one or more paging subchannels of the direct communication interface according to the sidelink paging occasion.

In one embodiment, the processor 702 further performs the following operations: receiving a first message from the second terminal, where the first message includes the first paging parameter.

In one embodiment, the first message is further used for indicating at least one of the following items: indicating that the sidelink paging occasion is related to the second offset, or indicating that the sidelink paging occasion is unrelated to the second offset; indicating one or more paging subchannels among multiple subchannels of the direct communication interface: where if the first message indicates that the sidelink paging occasion is related to the second offset, then the first paging parameter includes the second offset, else if the first message indicates that the sidelink paging occasion is unrelated to the second offset, then the first paging parameter does not include the second offset.

In one embodiment, the processor 702 further performs the following operations: transmitting a second message to the second terminal before monitoring the paging message, where the second message includes the air interface paging occasion and/or the identifier of the first terminal, and the air interface paging occasion is an occasion for the second terminal to monitor the paging message on the air interface.

In one embodiment, the processor 702 further performs the following operations: determining an air interface paging occasion according to a second paging parameter before monitoring the paging message: transmitting a second message to the second terminal, the second message including the air interface paging occasion and/or the identifier of the first terminal: where the second paging parameter includes at least one of a paging cycle, a number of paging frames in a single paging cycle, a number of paging times in a single paging cycle, a second offset, or the identifier of the first terminal: the second offset is an offset of a paging frame corresponding to an air interface for communication between the network device and a terminal, and the air interface paging occasion is an occasion for the second terminal to monitor the paging message on an air interface.

It should be noted here that the above-mentioned apparatus provided in the present application can implement all the method steps implemented by the first terminal in the above-mentioned method embodiments, and can achieve the same effects, so the same parts and beneficial effects in this embodiment and the method embodiments will not be detailed here.

Figure 8:
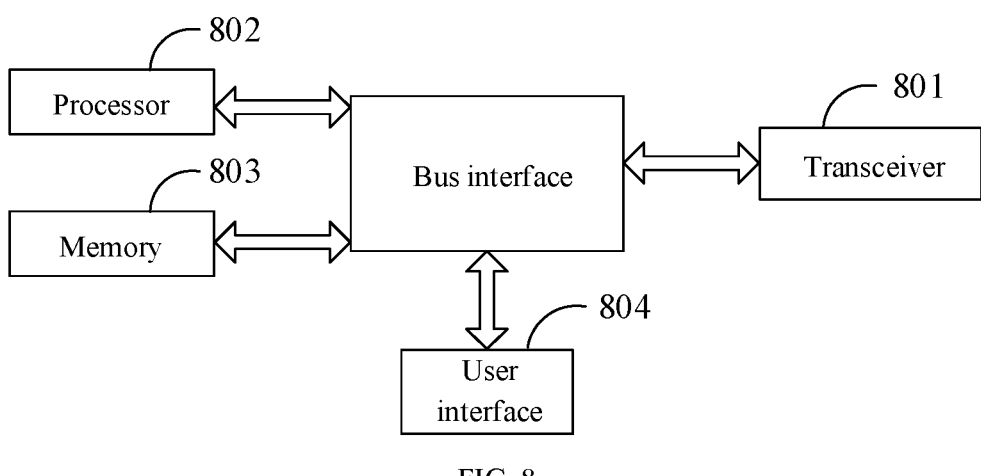
FIG. 8 is a schematic structural diagram of a paging apparatus provided in another embodiment of the present application.

On the terminal side, an embodiment of the present application provides a paging apparatus, as shown in FIG. 8, the paging apparatus of the present embodiment can be a terminal, and the paging apparatus may include a transceiver 801, a processor 802, and a memory 803.

The transceiver 801 is configured to receive and transmit data under the control of the processor 802.

In FIG. 8, a bus architecture can include any number of interconnected buses and bridges. In one embodiment, linked together by one or more processors represented by the processor 802 and various circuits of memory represented by the memory 803. The bus architecture can also link together various other circuits, such as a peripheral, a voltage regulator, and a power management circuit, which are well known in the field and are therefore not described further in herein. Bus interface provides an interface. The transceiver 801 can be multiple elements, i.e., including a transmitter and a receiver, providing a device for communication with various other devices on a transmission medium, the transmission medium includes a wireless channel, a wired channel, and an optical cable and so on. In one embodiment, the paging apparatus can also include a user interface 804, for different user devices, the user interface 804 can also be an interface may connect with a required device in an external or internal mode, the connected devices include but not limited to a keypad, a display, a speaker, a microphone, a joystick, etc.

The processor 802 is responsible for managing the bus architecture and general processing, and the memory 803 can store data used by the processor 802 when performing operations.

In one embodiment, the processor 802 can be a CPU, an ASIC, an FPGA, or a CPLD, a multi-core architecture can also be adopted by the processor 802.

The processor 802 is configured to execute, by invoking a computer program stored in the memory 803, any of the methods provided in the embodiments of the present application with respect to the first terminal in accordance with the obtained executable instructions. The processor 802 and the memory 803 can also be physically separated.

In one embodiment, the processor 802 performs the following operations when executing computer programs stored in the memory 803: receiving a paging message from a network device for paging a first terminal, the second terminal acting as a terminal for providing relay service to the first terminal: determining a sidelink paging occasion for the first terminal according to a discontinuous transmission DTX mechanism, the sidelink paging occasion being an occasion for the first terminal to monitor the paging message on a direct communication interface through which communication with the second terminal is performed: transmitting the paging message to the first terminal through the direct communication interface according to the sidelink paging occasion.

In one embodiment, the processor 802 further performs the following operations: determining the sidelink paging occasion according to a first paging parameter: where the first paging parameter includes at least one of a paging cycle, a number of paging frames in a single paging cycle, a first offset, or an identifier of the first terminal: the first offset is an offset of a paging frame corresponding to the direct communication interface.

In one embodiment, the first paging parameter further includes at least one of a second offset or an inter-interface wireless frame deviation, where the second offset is an offset of a paging frame corresponding to an air interface for communication between the network device and a terminal, and the inter-interface wireless frame deviation is a time deviation between an SFN of the air interface and a DFN of the direct communication interface.

In one embodiment, the sidelink paging occasion includes an SFN of a paging frame within the paging cycle, the processor 802 further performs the following operations: determining the SFN of the paging frame within the paging cycle according to the paging cycle, the number of paging frames in the single paging cycle, the first offset, the identifier of the first terminal, and/or at least one of the second offset or the inter-interface wireless frame deviation.

In one embodiment, if a clock synchronization source of the direct communication interface is the network device, a value of the inter-interface wireless frame deviation is zero; or, if a clock synchronization source of the direct communication interface is a satellite, a value of the inter-interface wireless frame deviation is an actual value of the time deviation between the SFN of the air interface and the DFN of the direct communication interface.

In one embodiment, the first paging parameter further includes a number of paging times in a single paging cycle, and the sidelink paging occasion includes an occasion of each paging within the paging cycle: the processor 802 further performs the following operations: determining an SFN of a paging frame within the paging cycle according to the paging cycle, the number of paging frames in the single paging cycle, the first offset, and the identifier of the first terminal: determining an SFN corresponding to a first paging within the paging cycle according to the number of paging frames in the single paging cycle, the number of paging times in the single paging cycle, and the identifier of the first terminal: determining the occasion of each paging within the paging cycle according to the SFN of the paging frame within the paging cycle and the SFN corresponding to the first paging within the paging cycle.

In one embodiment, the processor 802 further performs the following operations: transmitting the paging message on one or more paging subchannels of the direct communication interface according to the sidelink paging occasion.

In one embodiment, the processor 802 further performs the following operations: transmitting a first message to the first terminal, where the first message includes the first paging parameter.

In one embodiment, the first message is further used for indicating at least one of the following items: indicating that the sidelink paging occasion is related to the second offset, or indicating that the sidelink paging occasion is unrelated to the second offset; indicating one or more paging subchannels among multiple subchannels of the direct communication interface: where if the first message indicates that the sidelink paging occasion is related to the second offset, then the first paging parameter includes the second offset, else if the first message indicates that the sidelink paging occasion is unrelated to the second offset, then the first paging parameter does not include the second offset.

In one embodiment, the processor 802 further performs the following operations: determining an air interface paging occasion before receiving the paging message from the network device for paging the first terminal, where the air interface paging occasion is an occasion for the second terminal to monitor the paging message on the air interface; monitoring the paging message on the air interface according to the air interface paging occasion.

In one embodiment, the processor 802 further performs the following operations: determining an air interface paging occasion according to the second paging parameter, where the second paging parameter includes the paging cycle, the number of paging frames in a single paging cycle, the number of paging times in the single paging cycle, the second offset, and the identifier of the first terminal, the second offset is an offset of a paging frame corresponding to the air interface.

In one embodiment, the processor 802 further performs the following operations: receiving a second message transmitted from the first terminal before receiving the paging message from the network device for paging the first terminal: determining an air interface paging occasion according to the second message: monitoring the paging message on an air interface according to the air interface paging occasion: where the second message includes the air interface paging occasion and/or the identifier of the first terminal, the identifier of the first terminal is used for determining the air interface paging occasion and the sidelink paging occasion.

It should be noted here that the above-mentioned apparatus provided in the present application can implement all the method steps implemented by the second terminal in the above-mentioned methods embodiments, and can achieve the same effects, so the same parts and beneficial effects in this embodiment and the method embodiments will not be detailed here.

Figure 9:
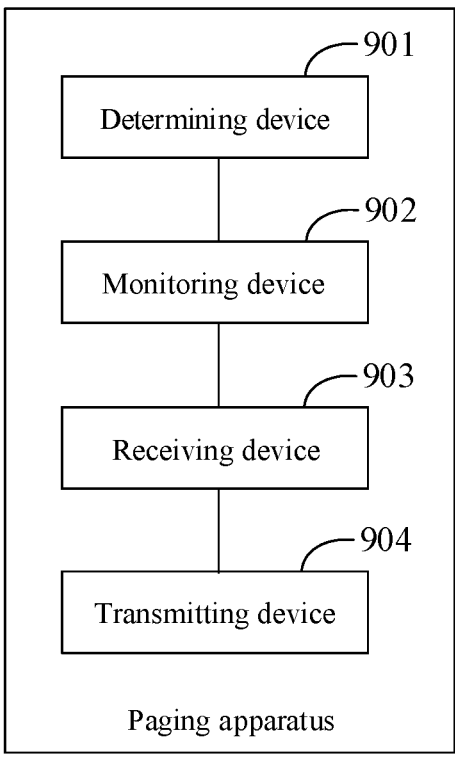
FIG. 9 is a schematic structural diagram of a paging apparatus provided in another embodiment of the present application.

On the terminal side, a paging apparatus is provided in another embodiment of the present application, as shown in FIG. 9, the paging apparatus of the present embodiment can be a terminal, and the paging apparatus include:

a determining device 901, configured to determine a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal;

a monitoring device 902, configured to monitor the paging message on the direct communication interface according to the sidelink paging occasion.

In one embodiment, the determining device 901 is configured to: determine the sidelink paging occasion according to a first paging parameter: where the first paging parameter includes at least one of a paging cycle, a number of paging frames in a single paging cycle, a first offset, or an identifier of the first terminal: the first offset is an offset of a paging frame corresponding to the direct communication interface.

In one embodiment, the first paging parameter further includes at least one of a second offset or an inter-interface wireless frame deviation, where the second offset is an offset of a paging frame corresponding to an air interface for communication between the network device and a terminal, and the inter-interface wireless frame deviation is a time deviation between an SFN of the air interface and a DFN of the direct communication interface.

In one embodiment, if a clock synchronization source of the direct communication interface is the network device, a value of the inter-interface wireless frame deviation is zero; or, if a clock synchronization source of the direct communication interface is a satellite, a value of the inter-interface wireless frame deviation is an actual value of the time deviation between the SFN of the air interface and the DFN of the direct communication interface.

In one embodiment, the sidelink paging occasion includes an SFN of a paging frame within the paging cycle, the determining device 901 is configured to: determine the SFN of the paging frame within the paging cycle according to the paging cycle, the number of paging frames in the single paging cycle, the first offset, the identifier of the first terminal, and/or at least one of the second offset or the inter-interface wireless frame deviation.

In one embodiment, the first paging parameter further includes a number of paging times in a single paging cycle, and the sidelink paging occasion includes an occasion of each paging within the paging cycle: the determining device 901 is configured to: determine an SFN of a paging frame within the paging cycle according to the paging cycle, the number of paging frames in the single paging cycle, the first offset, and the identifier of the first terminal: determining an SFN corresponding to a first paging within the paging cycle according to the number of paging frames in the single paging cycle, the number of paging times in the single paging cycle, and the identifier of the first terminal: determining the occasion of each paging within the paging cycle according to the SFN of the paging frame within the paging cycle and the SFN corresponding to the first paging within the paging cycle.

In one embodiment, the monitoring device 902 is configured to: monitor the paging message on one or more paging subchannels of the direct communication interface according to the sidelink paging occasion.

In one embodiment, the paging apparatus further includes: a receiving device 902, configured to receive a first message from the second terminal, where the first message includes the first paging parameter.

In one embodiment, the first message is further used for indicating at least one of the following items: indicating that the sidelink paging occasion is related to the second offset, or indicating that the sidelink paging occasion is unrelated to the second offset; indicating one or more paging subchannels among multiple subchannels of the direct communication interface; where if the first message indicates that the sidelink paging occasion is related to the second offset, then the first paging parameter includes the second offset, else if the first message indicates that the sidelink paging occasion is unrelated to the second offset, then the first paging parameter does not include the second offset.

In one embodiment, the paging apparatus further includes a transmitting device 902, configured to: determine an air interface paging occasion according to a second paging parameter before monitoring the paging message; transmit a second message to the second terminal, the second message including the air interface paging occasion and/or the identifier of the first terminal; where the second paging parameter includes at least one of a paging cycle, a number of paging frames in a single paging cycle, a number of paging times in a single paging cycle, a second offset, or the identifier of the first terminal; the second offset is an offset of a paging frame corresponding to an air interface for communication between the network device and a terminal, and the air interface paging occasion is an occasion for the second terminal to monitor the paging message on an air interface.

It should be noted here that the above-mentioned apparatus provided in the present application can implement all the method steps implemented by the first terminal in the above-mentioned methods embodiments, and can achieve the same effects, so the same parts and beneficial effects in this embodiment and the method embodiments will not be detailed here.

Figure 10:
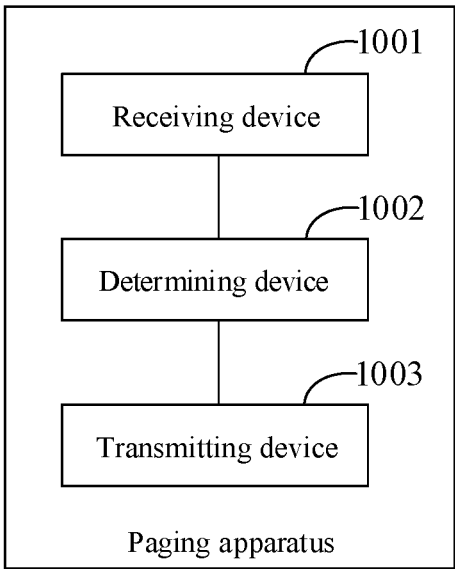
FIG. 10 is a schematic structural diagram of a paging apparatus provided in another embodiment of the present application.

On the terminal side, a paging apparatus is provided in another embodiment of the present application, as shown in FIG. 10, the paging apparatus of the present embodiment can be a terminal, and the paging apparatus include:

a receiving device 1001, configured to receive a paging message from a network device for paging a first terminal, the second terminal acting as a terminal for providing relay service to the first terminal;

a determining device 1002, configured to determine a sidelink paging occasion for the first terminal according to a discontinuous transmission (DTX) mechanism, the sidelink paging occasion being an occasion for the first terminal to monitor the paging message on a direct communication interface through which communication with the second terminal is performed;

a transmitting device 1003, configured to transmit the paging message to the first terminal through the direct communication interface according to the sidelink paging occasion.

In one embodiment, the determining device 1002 is configured to: determine the sidelink paging occasion according to a first paging parameter: where the first paging parameter includes at least one of a paging cycle, a number of paging frames in a single paging cycle, a first offset, or an identifier of the first terminal; the first offset is an offset of a paging frame corresponding to the direct communication interface.

In one embodiment, the first paging parameter further includes at least one of a second offset or an inter-interface wireless frame deviation, where the second offset is an offset of a paging frame corresponding to an air interface for communication between the network device and a terminal, and the inter-interface wireless frame deviation is a time deviation between an SFN of the air interface and a DFN of the direct communication interface.

In one embodiment, the sidelink paging occasion includes an SFN of a paging frame within the paging cycle, the determining device 1002 is configured to: determine the SFN of the paging frame within the paging cycle according to the paging cycle, the number of paging frames in the single paging cycle, the first offset, the identifier of the first terminal, and at least one of the second offset or the inter-interface wireless frame deviation.

In one embodiment, if a clock synchronization source of the direct communication interface is the network device, a value of the inter-interface wireless frame deviation is zero; or, if a clock synchronization source of the direct communication interface is a satellite, a value of the inter-interface wireless frame deviation is an actual value of the time deviation between the SFN of the air interface and the DFN of the direct communication interface.

In one embodiment, the first paging parameter further includes a number of paging times in a single paging cycle, and the sidelink paging occasion includes an occasion of each paging within the paging cycle: the determining device 1002 is configured to: determine an SFN of a paging frame within the paging cycle according to the paging cycle, the number of paging frames in the single paging cycle, the first offset, and the identifier of the first terminal: determine an SFN corresponding to a first paging within the paging cycle according to the number of paging frames in the single paging cycle, the number of paging times in the single paging cycle, and the identifier of the first terminal: determine the occasion of each paging within the paging cycle according to the SFN of the paging frame within the paging cycle and the SFN corresponding to the first paging within the paging cycle.

In one embodiment, the transmitting device 1003 is configured to: transmit the paging message on one or more paging subchannels of the direct communication interface according to the sidelink paging occasion.

In one embodiment, the transmitting device 1003 is further configured to: transmit a first message to the first terminal, where the first message includes the first paging parameter.

In one embodiment, the first message is further used for indicating at least one of the following items: indicating that the sidelink paging occasion is related to the second offset, or indicating that the sidelink paging occasion is unrelated to the second offset; indicating one or more paging subchannels among multiple subchannels of the direct communication interface: where if the first message indicates that the sidelink paging occasion is related to the second offset, then the first paging parameter includes the second offset, else if the first message indicates that the sidelink paging occasion is unrelated to the second offset, then the first paging parameter does not include the second offset.

In one embodiment, the receiving device 1001 is further configured to: receive a second message transmitted from the first terminal before receiving the paging message from the network device for paging the first terminal: determine an air interface paging occasion according to the second message: monitor the paging message on an air interface according to the air interface paging occasion: where the second message includes the air interface paging occasion and/or the identifier of the first terminal, the identifier of the first terminal is used for determining the air interface paging occasion and the sidelink paging occasion.

It should be noted here that the above-mentioned apparatus provided in the present application can implement all the method steps implemented by the second terminal in the above-mentioned methods embodiments, and can achieve the same effects, so the same parts and beneficial effects in this embodiment and the method embodiments will not be detailed here.

It should be noted that the division of units in the embodiment of the present application is illustrative, and is only a logical function division, there may be other division manners in actual implementations. In addition, each functional unit in each embodiment of the present application may be integrated in one processing unit, or may exist physically alone, or two or more units be integrated in one unit. The above integrated unit may be implemented in a form of hardware or software functional unit.

If the integrated unit is implemented in the form of software functional unit and sold or used as an independent product, it may be stored in a processor-readable storage medium. Based on this understanding, the embodiments in essence of the present application or the part that contributes to the existing technology or all or part of the embodiments may be embodied in the form of a software product, which is stored in a storage medium and includes several instructions to enable a computer device (which may be a personal computer, a server, or a network device, etc.) or a processor to perform all or a part of the steps of the method described in the embodiments of the present application. The aforementioned storage medium includes: a USB flash disk, a removable hard disk, a read-only memory (ROM), a random access memory (RAM), a magnetic disk or an optical disk or other medium that can store a program code.

On the terminal side, an embodiment of the present application provides a processor-readable storage medium that stores a computer program for causing a processor to perform any of the methods provided by the embodiments of the present application with respect to the terminal. The processor is caused to implement all the method steps implemented by the terminal in the above method embodiments, and can achieve the same effects. In this embodiment, parts and beneficial effects same as those of the method embodiments are not detailed here.

On the network side, an embodiment of the present application provides a processor-readable storage medium that stores a computer program for enabling a processor to perform any of the methods provided by the embodiments of the present application with respect to the network device. The processor is caused to implement all the method steps implemented by the network device in the above method embodiments, and can achieve the same effects. In this embodiment, parts and beneficial effects same as those of the method embodiments are not detailed here.

The processor-readable storage medium may be any available medium or data storage device that the processor can access, including but not limited to a magnetic memory (such as, a floppy disk, a hard disk, a magnetic tape, a magneto-optical disk (MO), etc.), an optical memory (such as, a CD, a DVD, a BD, a HVD, etc.), and a semiconductor memory (such as, an ROM, an EPROM, an EEPROM, a non-volatile memory (NAND FLASH), and a solid-state hard disk (SSD)), etc.

On the terminal side, an embodiment of the present application provides a computer program product containing instructions, when the instructions are run on a computer, the computer is caused to perform all the method steps implemented by the terminal in the above method embodiments, and the same effects can be achieved. In this embodiment, parts and beneficial effects same as those of the method embodiments are not detailed here.

On the network side, an embodiment of the present provides a computer program product containing instructions, when the instructions are run on a computer, the computer is caused to perform all the method steps implemented by the network device in the above method embodiments, and the same effects can be achieved. In this embodiment, parts and beneficial effects same as those of the method embodiments are not detailed here.

The embodiments of the present application can be provided as a method, a system, or a computer program product. Therefore, the present application may take the form of a complete hardware embodiment, a complete software embodiment, or an embodiment combining software and hardware aspects. Embodiments of the present application may take the form of a computer program product implemented on one or more computer storage mediums (including but not limited to a disk memory and an optical memory, etc.) including computer-readable program codes.

The present application is described with reference to flow charts and/or block diagrams of the method, apparatus, and computer program product according to the embodiment of the present application. It should be understood that each flow and/or block in the flow charts and/or block diagrams and the combination of flow and/or block in the flow charts and/or block diagrams can be realized by computer-executable instructions. These computer-executable instructions can be provided to a processor of a general purpose computer, a special purpose computer, an embedded processor or other programmable data processing devices to generate a machine, and the instructions executed by the processor of a computer or other programmable data processing devices generate a means for realizing the functions specified in one or more processes and/or one or more blocks of a flowchart.

These processor-executable instructions may also be stored in the processor-readable memory that can guide the computer or other programmable data processing devices to work in a specific way, and the instructions stored in the processor-readable memory generate a manufacturing product including an instruction apparatus, which implements the functions specified in one or more flows and/or one or more blocks of the flowchart.

These processor-executable instructions may also be loaded on a computer or other programmable data processing devices to enable a series of operation steps to be performed on the computer or other programmable devices to generate computer-implemented processing, and the instructions executed on the computer or other programmable devices provide steps for realizing the functions specified in one or more processes and/or one or more blocks of a flowchart.

The invention claimed is:

1. A paging method applied to a first terminal, wherein the paging method comprises:

determining a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal;

monitoring the paging message on the direct communication interface according to the sidelink paging occasion;

wherein determining the sidelink paging occasion according to the DRX mechanism, comprises:

determining the sidelink paging occasion according to a first paging parameter;

wherein the first paging parameter comprises at least one of a paging cycle, a number of paging frames in a single paging cycle, a first offset, or an identifier of the first terminal; the first offset is an offset of a paging frame corresponding to the direct communication interface.

2. The paging method according to claim 1, wherein the first paging parameter further comprises at least one of a second offset or an inter-interface wireless frame deviation, wherein the second offset is an offset of a paging frame corresponding to an air interface for communication between the network device and a terminal, and the inter-interface wireless frame deviation is a time deviation between a system frame number (SFN) of the air interface and a direct frame number (DFN) of the direct communication interface.

3. The paging method according to claim 2, wherein determining the sidelink paging occasion according to the first paging parameter, comprises:

determining a DFN of a paging frame within the paging cycle according to the paging cycle, the number of paging frames in the single paging cycle, the first offset, the identifier of the first terminal, and/or at least one of the second offset or the inter-interface wireless frame deviation.

4. The paging method according to claim 2, wherein if a clock synchronization source of the direct communication interface is the network device, a value of the inter-interface wireless frame deviation is zero; or, if a clock synchronization source of the direct communication interface is a satellite, a value of the inter-interface wireless frame deviation is an actual value of the time deviation between the SFN of the air interface and the DFN of the direct communication interface.

5. The paging method according to claim 1, wherein the first paging parameter further comprises a number of paging times in a single paging cycle, and the sidelink paging occasion comprises an occasion of each paging within the paging cycle;

wherein determining the sidelink paging occasion according to the first paging parameter, comprises:

determining a DFN of a paging frame within the paging cycle according to the paging cycle, the number of paging frames in the single paging cycle, the first offset, and the identifier of the first terminal;

determining a DFN corresponding to a first paging within the paging cycle according to the number of paging frames in the single paging cycle, the number of paging times in the single paging cycle, and the identifier of the first terminal;

determining the occasion of each paging within the paging cycle according to the DEN of the paging frame within the paging cycle and the DFN corresponding to the first paging within the paging cycle.

6. The paging method according to claim 1, wherein monitoring the paging message on the direct communication interface according to the sidelink paging occasion, comprises:

monitoring the paging message on one or more paging subchannels of the direct communication interface according to the sidelink paging occasion.

7. The paging method according to claim 2, further comprising:

receiving a first message from the second terminal, the first message comprising the first paging parameter, and the first message being further used for indicating at least one of the following items:

indicating that the sidelink paging occasion is related to the second offset, or indicating that the sidelink paging occasion is unrelated to the second offset;

indicating one or more paging subchannels among multiple subchannels of the direct communication interface;

wherein if the first message indicates that the sidelink paging occasion is related to the second offset, then the first paging parameter comprises the second offset, else if the first message indicates that the sidelink paging occasion is unrelated to the second offset, then the first paging parameter does not comprise the second offset.

8. The paging method according to claim 1, further comprising:

determining an air interface paging occasion according to a second paging parameter before monitoring the paging message;

transmitting a second message to the second terminal, the second message comprising the air interface paging occasion and/or the identifier of the first terminal;

wherein the second paging parameter comprises at least one of a paging cycle, a number of paging frames in a single paging cycle, a number of paging times in a single paging cycle, a second offset, or the identifier of the first terminal; the second offset is an offset of a paging frame corresponding to an air interface for communication between the network device and a terminal, and the air interface paging occasion is an occasion for the second terminal to monitor the paging message on an air interface.

9. A non-transitory processor-readable storage medium, wherein the processor-readable storage medium stores a computer program, the computer program is used for enabling a processor to execute the paging method according to claim 1.

10. A paging method applied to a second terminal, wherein the paging method comprises:

receiving a paging message from a network device for paging a first terminal, the second terminal acting as a terminal for providing relay service to the first terminal;

determining a sidelink paging occasion for the first terminal according to a discontinuous transmission (DTX) mechanism, the sidelink paging occasion being an occasion for the first terminal to monitor the paging message on a direct communication interface through which communication with the second terminal is performed;

transmitting the paging message to the first terminal through the direct communication interface according to the sidelink paging occasion;

wherein determining the sidelink paging occasion for the first terminal according to the DTX mechanism, comprises:

determining the sidelink paging occasion according to a first paging parameter;

wherein the first paging parameter comprises at least one of a paging cycle, a number of paging frames in a single paging cycle, a first offset, or an identifier of the first terminal; the first offset is an offset of a paging frame corresponding to the direct communication interface.

11. The paging method according to claim 10, wherein the first paging parameter further comprises at least one of a second offset or an inter-interface wireless frame deviation, wherein the second offset is an offset of a paging frame corresponding to an air interface for communication between the network device and a terminal, and the inter-interface wireless frame deviation is a time deviation between an SFN of the air interface and a DFN of the direct communication interface.

12. The paging method according to claim 11, wherein determining the sidelink paging occasion according to the first paging parameter, comprises:

determining a system frame number (DFN) of a paging frame within the paging cycle according to the paging cycle, the number of paging frames in the single paging cycle, the first offset, the identifier of the first terminal, and/or at least one of the second offset or the inter-interface wireless frame deviation.

13. The paging method according to claim 10, wherein the first paging parameter further comprises a number of paging times in a single paging cycle, and the sidelink paging occasion comprises an occasion of each paging within the paging cycle;

wherein determining the sidelink paging occasion according to the first paging parameter, comprises:

determining a DFN of a paging frame within the paging cycle according to the paging cycle, the number of paging frames in the single paging cycle, the first offset, and the identifier of the first terminal;

determining a DFN corresponding to a first paging within the paging cycle according to the number of paging frames in the single paging cycle, the number of paging times in the single paging cycle, and the identifier of the first terminal;

determining the occasion of each paging within the paging cycle according to the DEN of the paging frame within the paging cycle and the DFN corresponding to the first paging within the paging cycle.

14. The paging method according to claim 10, wherein transmitting the paging message to the first terminal through the direct communication interface according to the sidelink paging occasion, comprises:

transmitting the paging message on one or more paging subchannels of the direct communication interface according to the sidelink paging occasion.

15. The paging method according to claim 11, further comprising:

transmitting a first message to the first terminal, the first message comprising the first paging parameter, and the first message being further used for indicating at least one of the following items:

indicating that the sidelink paging occasion is related to the second offset, or indicating that the sidelink paging occasion is unrelated to the second offset;

indicating one or more paging subchannels among multiple subchannels of the direct communication interface;

wherein if the first message indicates that the sidelink paging occasion is related to the second offset, then the first paging parameter comprises the second offset, else if the first message indicates that the sidelink paging occasion is unrelated to the second offset, then the first paging parameter does not comprise the second offset.

16. The paging method according to claim 10, further comprising:

receiving a second message transmitted from the first terminal before receiving the paging message from the network device for paging the first terminal;

determining an air interface paging occasion according to the second message;

monitoring the paging message on an air interface according to the air interface paging occasion;

wherein the second message comprises the air interface paging occasion and/or the identifier of the first terminal, the identifier of the first terminal is used for determining the air interface paging occasion and the sidelink paging occasion.

17. A paging apparatus applied to the second terminal, wherein the paging apparatus comprises a memory, a transceiver, and a processor;

the memory is configured to store a computer program;

the transceiver is configured to transmit and receive data under control of the processor;

the processor is configured to read the computer program from the memory and execute the method according to claim 10.

18. A non-transitory processor-readable storage medium, wherein the processor-readable storage medium stores a computer program, the computer program is used for enabling a processor to execute the paging method according to claim 10.

19. A paging apparatus applied to the first terminal, wherein the paging apparatus comprises a memory, a transceiver, and a processor;

the memory is configured to store a computer program;

the transceiver is configured to transmit and receive data under control of the processor;

the processor is configured to read the computer program from the memory and perform the following operations:

determining a sidelink paging occasion according to a discontinuous reception (DRX) mechanism, the sidelink paging occasion being an occasion for the first terminal to monitor a paging message on a direct communication interface through which communication between the first terminal and a second terminal is performed, the second terminal being a terminal that provides a relay service to the first terminal, and the paging message being a paging message from a network device for paging the first terminal;

monitoring the paging message on the direct communication interface according to the sidelink paging occasion;

wherein the processor further performs the following operations:

determining the sidelink paging occasion according to a first paging parameter;

wherein the first paging parameter comprises at least one of a paging cycle, a number of paging frames in a single paging cycle, a first offset, or an identifier of the first terminal; the first offset is an offset of a paging frame corresponding to the direct communication interface.

* * * * *